(12) United States Patent
Furuta et al.

(10) Patent No.: US 11,135,668 B2
(45) Date of Patent: Oct. 5, 2021

(54) WIRE ELECTRICAL DISCHARGE MACHINE

(71) Applicant: FANUC CORPORATION, Yamanashi (JP)

(72) Inventors: Tomoyuki Furuta, Yamanashi-ken (JP); Tomoaki Matsunaga, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 551 days.

(21) Appl. No.: 15/689,432

(22) Filed: Aug. 29, 2017

(65) Prior Publication Data
US 2018/0056421 A1 Mar. 1, 2018

(30) Foreign Application Priority Data

Sep. 1, 2016 (JP) .............................. JP2016-170605

(51) Int. Cl.
*B23H 7/30* (2006.01)
*B23H 1/02* (2006.01)
(Continued)

(52) U.S. Cl.
CPC .............. *B23H 7/30* (2013.01); *B23H 1/024* (2013.01); *B23H 1/028* (2013.01); *B23H 1/04* (2013.01);
(Continued)

(58) Field of Classification Search
CPC .......... B23H 7/30; B23H 1/024; B23H 1/028; B23H 1/04; B23H 7/04; B23H 7/065;
(Continued)

(56) References Cited

U.S. PATENT DOCUMENTS 4,720,616 A * 1/1988 Inoue ..................... B23H 1/022
204/224 M
5,603,852 A * 2/1997 Goto ........................ B23H 1/02
219/69.13
(Continued)

FOREIGN PATENT DOCUMENTS

CN 104487196 A 4/2015
JP 5656341 A 5/1981
(Continued)

OTHER PUBLICATIONS

Partial European Search Report dated Feb. 19, 2018 for related EP Application No. 17001463.3, 16 pgs.
(Continued)

*Primary Examiner* — Dana Ross
*Assistant Examiner* — Kuangyue Chen
(74) *Attorney, Agent, or Firm* — Fredrikson & Byron, P.A.

(57) ABSTRACT

A wire electrical discharge machine includes a first voltage applying circuit, a second voltage applying circuit, and a switch controller. The first voltage applying circuit includes a first DC power source for applying a positive polarity voltage across an electrode gap, and a first switch for on/off-switching of application of the positive polarity voltage. The second voltage applying circuit includes a second DC power source for applying a reverse polarity voltage to the electrode gap, and a second switch for on/off-switching of application of the reverse polarity voltage. The switch controller controls the first switch and the second switch so that the first switch and the second switch are not turned on simultaneously. The first DC power source and the second DC power source are set up so that the absolute value of the reverse polarity voltage is lower than the absolute value of the positive polarity voltage.

10 Claims, 12 Drawing Sheets

(51) Int. Cl.
*B23H 7/20* (2006.01)
*B23H 7/10* (2006.01)
*B23H 1/04* (2006.01)
*B23H 7/06* (2006.01)
*B23H 7/04* (2006.01)

(52) U.S. Cl.
CPC ............... *B23H 7/04* (2013.01); *B23H 7/065* (2013.01); *B23H 7/10* (2013.01); *B23H 7/20* (2013.01); *B23H 1/022* (2013.01); *B23H 2300/20* (2013.01)

(58) Field of Classification Search
CPC . B23H 7/10; B23H 7/20; B23H 1/022; B23H 2300/20
USPC ...................................................... 219/69.15
See application file for complete search history.

(56) References Cited

U.S. PATENT DOCUMENTS

| | | | | |
|---|---|---|---|---|
| 5,897,792 | A * | 4/1999 | Kaneko | B23H 1/022 219/69.18 |
| 6,107,593 | A * | 8/2000 | Tsai | B23H 1/022 219/69.12 |
| 6,630,641 | B2 | 10/2003 | Tamida et al. | |
| 7,638,726 | B2 * | 12/2009 | Hashimoto | B23H 7/04 219/69.12 |
| 2005/0127041 | A1 | 6/2005 | Kobayashi et al. | |
| 2008/0110865 | A1 * | 5/2008 | Hashimoto | B23H 1/022 219/69.12 |
| 2010/0294743 | A1 | 11/2010 | Hashimoto et al. | |

FOREIGN PATENT DOCUMENTS

| | | | |
|---|---|---|---|
| JP | 61192415 | A | 8/1986 |
| JP | 6368317 | A | 3/1988 |
| JP | 3208520 | A | 9/1991 |
| JP | 5264788 | B2 * | 8/2013 ............. B23H 1/022 |

OTHER PUBLICATIONS

English Abstract and Machine Translation for Japanese Publication No. 61-192415 A, published Aug. 27, 1986, 11 pgs.
English Abstract and Machine Translation for Japanese Publication No. 56-056341 A, published May 18, 1981, 6 pgs.
English Abstract and Machine Translation for Japanese Publication No. 63-068317 A, published Mar. 28, 1988, 7 pgs.
English Abstract and Machine Translation for Japanese Publication No. 03-208520 A, published Sep. 11, 1991, 6 pgs.
English Abstract and Machine Translation for Chinese Publication No. 104487196 A, published Apr. 1, 2015, 13 pgs.

* cited by examiner

WIRE ELECTRICAL DISCHARGE MACHINE

CROSS-REFERENCE TO RELATED APPLICATION

This application is based upon and claims the benefit of priority from Japanese Patent Application No. 2016-170605 filed on Sep. 1, 2016, the contents of which are incorporated herein by reference.

BACKGROUND OF THE INVENTION

Field of the Invention

The present invention relates to a wire electrical discharge machine for machining a workpiece with a wire electrode.

Description of the Related Art

In the wire electrical discharge machine, not only the object to be processed but also the wire electrode itself wears and diminishes. When a workpiece is machined in a (dielectric) working fluid, in order to prevent occurrence of electric corrosion or adhesion of a coating to the workpiece due to electrolytic action, it is a common practice to perform electrical discharge machining by applying AC voltage between the wire electrode and the workpiece (across the electrode gap).

When voltage (a positive polarity voltage), with the workpiece side set positive and the wire electrode set negative, is applied to the electrode gap, the workpiece wears more. On the other hand, when voltage (a reverse polarity voltage), with the workpiece side set negative and the wire electrode set positive, is applied to the electrode gap, the wire electrode wears more.

Japanese Laid-Open Patent Publication No. 03-208520 discloses a machining pulse control method for an electrical discharge machine. The technology described in Japanese Laid-Open Patent Publication No. 03-208520 aims to prevent, by applying reverse polarity voltage, deterioration of the external appearance of the work surface due to adhesion of molten brass from the wire electrode and to improve, at the finishing stage, the surface roughness while avoiding the occurrence of electrolytic phenomenon. Specifically, the reverse polarity voltage is set with a magnitude at which discharge occurs while the positive polarity voltage is set at a magnitude at which discharge will not take place.

SUMMARY OF THE INVENTION

Since the wire electrode travels from the top to the bottom, an upper portion of the workpiece is machined by the wire electrode less exhausted and a lower portion of the workpiece is machined by the wire electrode more exhausted. In other words, the closer to the bottom of the workpiece the wire electrode is, the thinner the wire electrode becomes. For this reason, the machined workpiece tends to become thicker toward the bottom compared to the upper portion, hence the machining precision deteriorates.

Nevertheless, since, in Japanese Laid-Open Patent Publication No. 03-208520, the reverse polarity voltage is set at the level at which discharge is generated while the positive polarity voltage is set a level at which discharge will not occur, it is impossible to suppress consumption of the wire electrode.

It is therefore an object of the present invention to provide a wire electrical discharge machine capable of suppressing consumption of the wire electrode.

One aspect of the present invention resides in an electrical discharge machine for effecting electrical discharge machining on a workpiece by applying voltage across an electrode gap formed between a wire electrode and the workpiece, comprising: a first voltage applying circuit including a first DC power source connected across the electrode gap so as to apply a positive polarity voltage with the workpiece side being the positive electrode and the wire electrode side being the negative electrode, and a first switch arranged between the first DC power source and the electrode gap and configured to perform on/off switching control of applying the positive polarity voltage across the electrode gap; a second voltage applying circuit including a second DC power source connected across the electrode gap so as to apply a reverse polarity voltage with the wire electrode side being the positive electrode and the workpiece side being the negative electrode, and a second switch arranged between the second DC power source and the electrode gap and configured to on/off switching control of applying the reverse polarity voltage across the electrode gap; and a switch controller configured to perform on/off control of the switch and the second switch and control the switch and the second switch such that the switch and the second switch are not turned on simultaneously, and is characterized in that the first DC power source and the second DC power source are configured so that an absolute value of the reverse polarity voltage is lower than an absolute value of the positive polarity voltage.

According to this configuration, it is possible to suppress consumption of the wire electrode and thus prevent deterioration of machining accuracy. In addition, since the positive polarity voltage and the reverse polarity voltage are applied across the electrode gap, it is possible to prevent occurrence of electrolytic phenomena and electrolytic corrosion on the workpiece.

The switch controller may control the first switch and the second switch so as to alternate a first duration for applying the positive polarity voltage across the electrode gap and a second duration for applying the reverse polarity voltage across the electrode gap. This configuration makes it possible to suppress consumption of the wire electrode 12 and prevent deterioration of machining accuracy as well as to prevent occurrence of electrolytic phenomena and electrolytic corrosion on the workpiece.

The second duration may be set to be longer than the first duration. This configuration further makes it possible to prevent occurrence of electrolytic phenomena and electrolytic corrosion on the workpiece.

The wire electrical discharge machine may further include: a voltage detector configured to detect a voltage across the electrode gap; an average voltmeter configured to measure an average voltage across the electrode gap based on the voltage across the electrode gap detected by the voltage detector; and a duration setting changer configured to change at least one of the first duration and the second duration so that the average voltage across the electrode gap measured by the average voltmeter approaches a target voltage.

Thereby, it is possible to make the average voltage across the electrode gap closer to the target voltage. Accordingly, it is possible to prevent deterioration of machining accuracy while further suppressing consumption of the wire electrode.

In addition, it is possible to further prevent occurrence of electrolytic phenomena and electrolytic corrosion on the workpiece.

A first continuous on-time as one unit of the on-time of the first switch and a second continuous on-time as one unit of the on-time of the second switch may be determined beforehand, and the first continuous on-time may be a length equal to or shorter than the first duration and the second continuous on-time may be equal to or shorter than the second duration. The switch controller may turn on the first switch once or multiple times in the first duration so as to apply the positive polarity voltage across the electrode gap and turn on the second switch once or multiple times in the second duration so as to apply the reverse polarity voltage across the electrode gap. Further, the first continuous on-time and the second continuous on-time, the number of times the first switch is turned on in the first duration and the number of times the second switch is turned on in the second duration may be designated so that the time for which the reverse polarity voltage is actually applied across the electrode gap in the second duration is longer than the time for which the positive polarity voltage is actually applied across the electrode gap.

This makes it possible to make the time for which the reverse polarity voltage of a lower absolute value is actually applied to the electrode gap longer than the time for which the positive polarity voltage of a higher absolute value is actually applied to the electrode gap. Accordingly, it is possible to prevent deterioration of machining accuracy while further suppressing consumption of the wire electrode. In addition, it is possible to further prevent occurrence of electrolytic phenomena and electrolytic corrosion on the workpiece.

One unit of the on-time of the first switch may be the first duration T1 and one unit of the on-time of the second switch may be the second duration. The switch controller may set the first switch on in the first duration and set the second switch on in the second duration.

This makes it possible to make the time for which the reverse polarity voltage of a lower absolute value is actually applied to the electrode gap longer than the time for which the positive polarity voltage of a higher absolute value is actually applied to the electrode gap. Accordingly, it is possible to prevent deterioration of machining accuracy while further suppressing consumption of the wire electrode. In addition, it is possible to further prevent occurrence of electrolytic phenomena and electrolytic corrosion on the workpiece.

A first continuous on-time as one unit of the on-time of the first switch and a second continuous on-time as one unit of the on-time of the second switch may have been determined previously. The wire electrical discharge machine may further include: a voltage detector configured to detect a voltage across the electrode gap; an average voltmeter configured to measure an average voltage across the electrode gap based on the voltage across the electrode gap detected by the voltage detector; and a polarity determiner configured to compare the average voltage across the electrode gap measured by the average voltmeter with a target voltage, determine the polarity that makes the average voltage approach the target voltage and select the polarity to be applied next. The switch controller may control the first switch and the second switch so as to apply the voltage of the polarity determined by the polarity determiner.

Thereby, it is possible to make the average voltage across the electrode gap closer to the target voltage. Accordingly, it is possible to prevent deterioration of machining accuracy while further suppressing consumption of the wire electrode. In addition, it is possible to further prevent occurrence of electrolytic phenomena and electrolytic corrosion on the workpiece.

The second voltage applying circuit may further include a current limiting resistor inserted between the second DC power source and the electrode gap. As a result, it is possible to more effectively suppress consumption of the wire electrode even when electrical discharge has occurred due to application of the reverse polarity voltage to the electrode gap (the second switch being turned on).

The first voltage applying circuit may further include a first capacitor connected in parallel with the first DC power source. The second voltage applying circuit may further include a second capacitor connected in parallel to the second DC power source. The capacitance of the first capacitor may be equal to or higher than the capacitance of the second capacitor.

This configuration makes it possible to increase the discharge current flowing through the electrode gap as a result of application of the positive polarity voltage to the electrode gap, thereby increasing the machining amount and improving the machining efficiency. In addition, it is possible to suppress the discharge current flowing through the electrode gap as a result of application of the reverse polarity voltage to the electrode gap and thus suppress the consumption of the wire electrode.

The wire electrical discharge machine may further include: a voltage detector configured to detect the voltage across the electrode gap; a discharge determiner configured to determine whether or not electrical discharge has occurred based on the voltage across the electrode gap detected by the voltage detector; a third voltage applying circuit including a third DC power source connected across the electrode gap so as to apply a main cutting volt of positive polarity between the workpiece side as the positive electrode and the wire electrode side as the negative electrode; and a third switch provided between the third DC power source and the electrode gap to perform on/off switching of application of the main cutting volt to the electrode gap. When the discharge determiner determines that electrical discharge has occurred during the period from the start of application of one of the positive polarity voltage or the reverse polarity voltage to the end of the application, the switch controller may turn on the third switch to apply the main cutting volt across the electrode gap for main machining current to flow therethrough. As a result, it is possible to increase the machining amount of the workpiece while suppressing consumption of the wire electrode.

According to the present invention, it is possible to suppress consumption of the wire electrode and prevent deterioration of machining accuracy. Since the positive polarity voltage and the reverse polarity voltage are applied across the electrode gap, it is possible to prevent occurrence of electrolytic phenomena and electrolytic corrosion on the workpiece.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
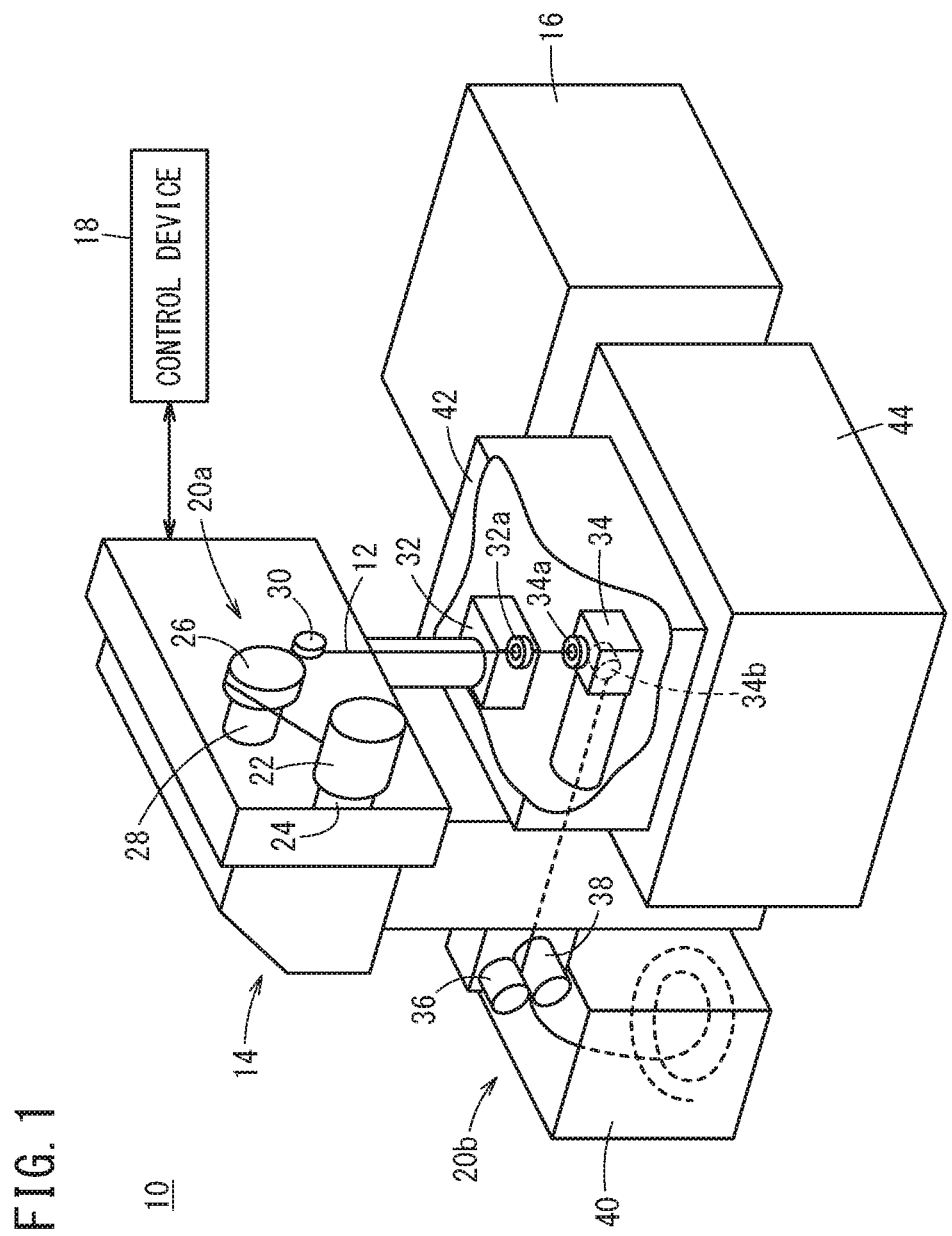
FIG. 1 is a mechanical schematic configuration diagram of a wire electrical discharge machine.

A wire electrical discharge machine according to the present invention will be described in detail hereinbelow with reference to the accompanying drawings, by referring to preferred embodiments;

FIG. 1 is a mechanical schematic configuration diagram of a wire electrical discharge machine 10. The wire electrical discharge machine 10 is a machine tool that applies voltage to an electrode gap (clearance) EG (see FIG. 2) formed between a wire electrode 12 and a workpiece W (see FIG. 2) to generate electric discharge in the working fluid, thereby performing machining (electrical discharge machining) on the workpiece W. The wire electrical discharge machine 10 includes a main machine body 14, a working fluid processor 16, and a control device 18.

The wire electrode 12 is formed of, for example, metal material such as tungsten-based, copper alloy-based, brass-based material. On the other hand, the workpiece W is formed of, for example, a metallic material such as iron-based material, superhard material (tungsten carbide) and the like.

The main machine body 14 includes a supply path 20a that supplies the wire electrode 12 toward the workpiece (the object to be machined) W and a collection path 20b that collects the wire electrode 12 having passed through the workpiece W.

The supply path 20a includes a wire bobbin 22 with the wire electrode 12 wound thereon, a torque motor 24 that applies a torque to the wire bobbin 22, a brake shoe 26 that applies a braking force of friction to the wire electrode 12, a braking motor 28 that applies a braking torque to the brake shoe 26, a tension detector 30 that detects the tension of the wire electrode 12, and a wire guide (upper wire guide) 32 that guides the wire electrode 12 above the workpiece W.

The collection path 20b includes a wire guide (lower wire guide) 34 that guides the wire electrode 12 below the workpiece W, a pinch roller 36 and feed roller 38 that are capable of gripping the wire electrode 12, and a wire collection box 40 that collects the wire electrode 12 transferred by the pinch roller 36 and feed roller 38.

The main machine body 14 includes a work-pan 42 capable of storing a working fluid such as deionized water or oil that is used in the electrical discharge machining with the wire guides 32 and 34 arranged in the work-pan 42. The work-pan 42 is placed on a base 44. The workpiece W is placed between the wire guides 32 and 34. The wire guides 32 and 34 respectively have die guides 32a and 34a that support the wire electrode 12. The wire guide 34 includes a guide roller 34b that guides the wire electrode 12 to the pinch roller 36 and the feed roller 38 changing the direction of the wire electrode 12.

The wire guide 32 ejects a clean working fluid not containing sludge (machining chips). This function makes it possible to fill the clearance (electrode gap) EG between the wire electrode 12 and the workpiece W with the clean working fluid suitable for the electrical discharge machining, and also prevent the accuracy of the electrical discharge machining from being deteriorated by sludge produced during the electrical discharge machining. The wire guide 34 may also emit a clean working fluid not containing sludge.

The workpiece W is supported by a table (not shown) movable in the X-direction and the Y-direction. The wire guides 32, 34, the workpiece W, and the table are immersed in the working fluid stored in the work-pan 42.

This workpiece W is formed with a start hole or machining slot (neither shown) from which the electrical discharge machining is started. Through the start hole or the machining slot, the wire electrode 12 is inserted and the wire feeding is conducted. The gap between the start hole or the machining slot of the workpiece W and the wire electrode 12 forms the electrode gap EG. After the wire electrode 12 is passed through the start hole or the machining slot and the wire feeding is done, the wire electrical discharge machine 10, while sending out the wire electrode 12 toward the workpiece W in the downward direction (negative Z-direction), moves the aforementioned table (the workpiece W) along a plane parallel to the XY-plane, thereby to machine the workpiece W. The wire feeding of the wire electrode 12 means that the wire electrode 12 wound on the wire bobbin 22 is passed through the wire guide 32, the workpiece W, and the wire guide 34 and pinched by the pinch roller 36 and the feed roller 38. When the wire feeding of the wire electrode 12 is done, a predetermined tension arises in the wire electrode 12. Here, the X-direction and the Y-direction are orthogonal to each other, and the direction orthogonal to the XY-plane (horizontal plane) is defined as the Z-direction (the direction in which gravity acts).

The working fluid processor 16 is a device that removes machining chips (sludge) produced in the work-pan 42 and manages the quality of the working fluid by adjusting the electric resistivity and temperature and the like. The working fluid whose fluid quality has been adjusted by this working fluid processor 16 is returned to the work-pan 42 again. The control device 18 controls the main machine body 14 and the working fluid processor 16.

Figure 2:
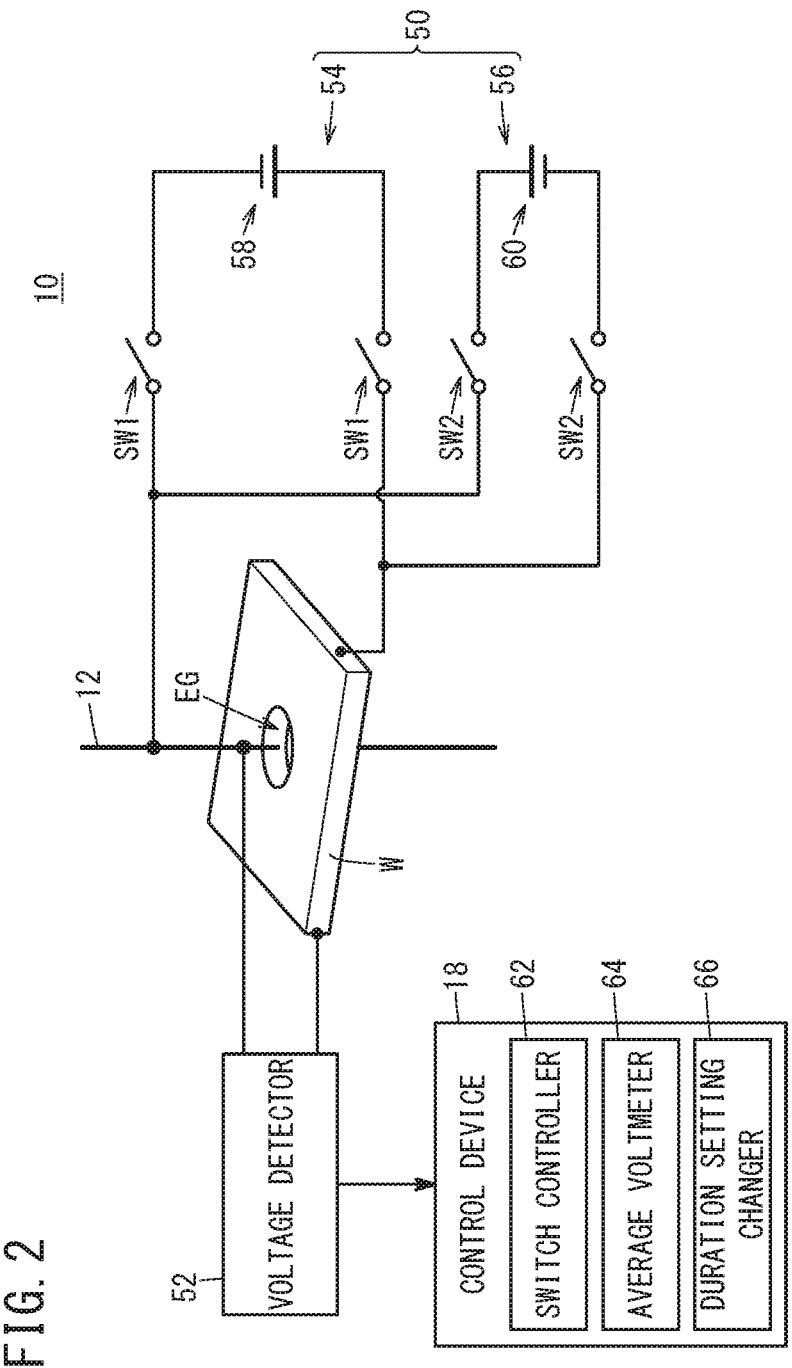
FIG. 2 is an electrical circuit configuration diagram of a wire electrical discharge machine for applying cutting voltage across the machining gap formed between a wire electrode and a workpiece.

FIG. 2 is an electrical configuration diagram of the wire electrical discharge machine 10 that applies cutting volt to the electrode gap EG formed between the wire electrode 12 and the workpiece W. The wire electrical discharge machine 10 includes a machining power source 50 and a voltage detector 52. The machining power source 50 is a power supply that applies voltage to the electrode gap EG. The machining power source 50 is controlled by the control device 18. The machining power source 50 includes a first voltage applying circuit 54 and a second voltage applying circuit 56.

The first voltage applying circuit 54 includes a first DC power source 58 connected to the electrode gap EG so as to apply a positive polarity voltage with the workpiece W side set positive and the wire electrode 12 side set negative, and first switches SW1 arranged between the first DC power source 58 and the electrode gap EG to turn on and off the application of positive polarity voltage to the electrode gap EG. In FIG. 2, the first switches SW1 are arranged between the positive electrode of the first DC power source 58 and the workpiece W and between the negative electrode of the first DC power source 58 and the wire electrode 12 but a first switch SW1 may be provided only either between the positive electrode of the first DC power source 58 and the workpiece W or between the negative electrode of the first DC power source 58 and the wire electrode 12.

The second voltage applying circuit 56 includes a second DC power source 60 connected to the electrode gap EG as to apply a reverse polarity voltage with the wire electrode 12 side set positive and the workpiece W side set negative, and second switches SW2 arranged between the second DC power source 60 and the electrode gap EG to turn on and off the application of reverse polarity voltage to the electrode gap EG. In FIG. 2, the second switches SW2 are arranged between the positive electrode of the second DC power source 60 and the wire electrode 12 and between the negative electrode of the second DC power source 60 and the workpiece W but a second switch SW2 may be provided only either between the positive electrode of the second DC power source 60 and the wire electrode 12 or between the negative electrode of the second DC power source 60 and the workpiece W.

Here, the first DC power source 58 and the second DC power source 60 are configured such that the absolute value (magnitude) of the reverse polarity voltage of the second DC power source 60 becomes lower than the absolute value (magnitude) of the positive polarity voltage of the first DC power source 58. Both the positive polarity voltage and the reverse polarity voltage are of a voltage level that can cause electric discharge across the electrode gap EG and enable current (machining current) to flow therethrough. Since Veg, the voltage across the electrode gap EG, is defined as the voltage of the wire electrode 12 with respect to the workpiece W, application of positive polarity voltage gives a negative (−) voltage and application of reverse polarity voltage gives a positive (+) voltage.

The voltage detector 52 is a voltage sensor that detects the voltage Veg across the electrode gap EG.

The control device 18 has a processor such as a CPU and a memory chip storing a program therein. When the processor executes the program, the function of the control device 18 of the present embodiment is provided.

The control device 18 includes a switch controller 62, an average voltmeter 64, and a duration setting changer 66. The switch controller 62 performs on/off control (controls the turning-on and -off) of the first switch SW1 and the second switch SW2. The switch controller 62 controls the first switch SW1 and the second switch SW2 so that the first switch SW1 and the second switch SW2 are not turned on at the same time. The first switch SW1 and the second switch SW2 may be semiconductor switching elements made up by transistors etc. When the first switch SW1 is turned on, a positive polarity voltage (negative voltage) is applied across the electrode gap EG by the first DC power source 58, and when the second switch SW2 is turned on, the reverse polarity voltage (positive voltage) is applied across the electrode gap EG by the second DC power source 60.

Here, a duration in which the positive polarity voltage is applied to the electrode gap EG is referred to as a first duration T1, and a duration in which a reverse polarity voltage is applied is referred to as a second duration T2. The switch controller 62 controls the first switch SW1 and the second switch SW2 so as to alternate the first duration T1 and the second duration T2. It should be noted that the first duration T1 is a period including at least a time during which the positive polarity voltage is applied to the electrode gap EG and the second duration T2 is a period including at least a time in which a reverse polarity voltage is applied to the electrode gap EG.

The first duration T1 and the second duration T2 are determined beforehand. The second duration T2 may be set longer than the first duration T1. For example, since the absolute value (magnitude) of the positive polarity voltage applied to the electrode gap EG in the first duration T1 is greater than the absolute value (magnitude) of the reverse polarity voltage applied to the electrode gap EG in the second duration T2, in order to set the average voltage Va across the electrode gap EG to a target voltage (for example, 0 V) higher than the positive polarity voltage it is necessary to make the second duration T2 longer than the first duration T1. Though, in the present embodiment, the target voltage is set at 0 V, depending on the materials of the wire electrode 12 and the workpiece (workpiece) W and the magnitude of the voltage applied to the electrode gap EG the average voltage Va may be biased to the negative side (=positive polarity side) in order to prevent electrolytic corrosion on the wire electrode 12, or may be biased, on the contrary, to the positive side (=reverse polarity side) in order to prevent electrolytic corrosion on the workpiece W.

The average voltmeter 64 measures the average voltage Va across the electrode gap EG based on the voltage Veg across the electrode gap EG detected by the voltage detector 52. The average voltmeter 64 sequentially stores the voltage Veg across the electrode gap EG detected by the voltage detector 52, and calculates (measures) the average voltage Va across the electrode gap EG by averaging the plurality of stored voltages Veg.

The duration setting changer 66 changes at least one of the first duration T1 and the second duration T2. The duration setting changer 66 changes at least one of the first duration T1 and the second duration T2 so that the average voltage Va across the electrode gap EG measured by the average voltmeter 64 approaches the target voltage. In this embodiment, since the target voltage is set to 0V in order to reliably prevent the occurrence of the electrolytic phenomenon and the electrolytic corrosion of the workpiece W, the second duration T2 is set to be longer than the first duration T1.

The switch controller 62 performs on/off control of the first switch SW1 and the second switch SW2 based on the first duration T1 and the second duration T2 changed by the duration setting changer 66. It is not necessary to provide the duration setting changer 66. In this case, the switch controller 62 may control the first switch SW1 and the second switch SW2 based on the preset first duration T1 and the second duration T2.

Next, the control of the first switch SW1 and the second switch SW2 by the switch controller 62 will be described in detail. The control method of the first switch SW1 and the second switch SW2 will be described by giving two examples.

<First Switch Control Method>

In the first switch control method, one unit of the on-time of the first switch SW1 (hereinafter referred to as first continuous on-time To1) and one unit of the on-time of the second switch SW2 (hereinafter referred to as second ON on-time To2) have been determined beforehand. The first continuous on-time To1 is equal to or shorter than the first duration T1 and the second continuous on-time To2 is equal to or shorter than the second duration T2. The second continuous on-time To2 may be equal to or longer than the first continuous on-time To1.

The switch controller 62 turns on the first switch SW1 once or multiple times within the first duration T1 to thereby apply positive polarity voltage across the electrode gap EG, and turns on the second switch SW2 once or multiple times within the second duration T2 to thereby apply reverse polarity voltage across the electrode gap EG. When N1 is the number of times (the first predetermined number of times) the first switch SW1 is turned on during the first duration T1 and N2 is the number of times the second switch SW2 is turned on during the second duration T2 (second predetermined number of times), the first continuous on-time To1, the second continuous on-time To2, and the numbers of times N1 and N2 have been determined so that the time (=To2×N2) in which the reverse polarity voltage is actually applied to the electrode gap EG will become longer than the time (=To1×N1) in which the positive polarity voltage is actually applied to the electrode gap EG.

The first duration T1, the first continuous on-time To1, and the number of times N1 have a relationship of T1≥To1× N1 while the second duration T2, the second continuous on-time To2, and the number of times N2 have a relationship of T2≥To2×N2. At this time, it is preferable that the first continuous on-time To1 and the number N1, and the second continuous on-time To2 and the number N2 have a relationship of (To1×N1)/(To2×N2)=(reverse polarity voltage)/(positive polarity voltage).

Figure 3:
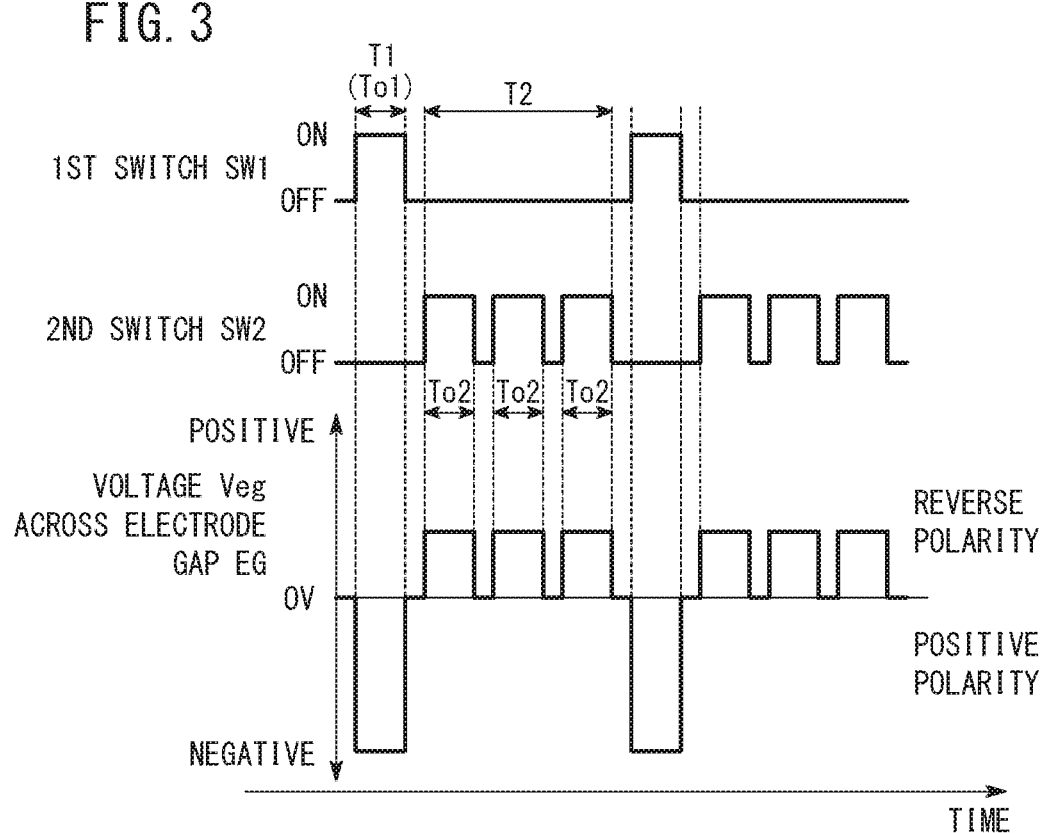
FIG. 3 is a time chart showing the voltage across the electrode gap when a switch controller shown in FIG. 2 controls the first switch and the second switch by a first switching control method.

FIG. 3 is a time chart showing the voltage Veg across the electrode gap EG when the switch controller 62 controls the first switch SW1 and the second switch SW2 on the basis of the first switch control method. In the example shown in FIG. 3, To1=To2, N1=1, N2=3, and the ratio between the absolute value of the positive polarity voltage and the absolute value of the reverse polarity voltage is set at approximately 3:1.

In order to make it easy to grasp the application of voltage across the electrode gap EG by the switching of the first switch SW1 and the second switch SW2, FIG. 3 shows a state in which no sparks (electric discharge) are occurring across the electrode gap EG even when the positive polarity voltage and the reverse polarity voltage are applied at the electrode gap EG. In the case where spark occurs, the absolute value of the voltage applied to the electrode gap EG drops to the arc voltage. As this discharge occurs, a discharge current (machining current) flows through the electrode gap EG so that the workpiece W is machined. That is, unless discharge occurs, the workpiece W will not be machined and the wire electrode 12 will not wear off.

As can be seen from FIG. 3, the switch controller 62 controls the first switch SW1 and the second switch SW2 so as to alternate the first duration T1 for applying the positive polarity voltage and the second duration T2 for applying the reverse polarity voltage. In the example shown in FIG. 3, every time the first switch SW1 is turned on, the second switch SW2 are turned on three times. The reason is that the ratio between the absolute value of the positive polarity voltage and the absolute value of the reverse polarity voltage is about 3:1 and even in that case the average voltage Va across the electrode gap EG is kept around 0V (the target voltage).

Accordingly, the first duration T1 becomes equal to the first continuous on-time To1 (T1=To1). Since the second duration T2 is a period during which the second switch SW2 is turned on three times, the period from when the second switch SW2 is turned on for the first time until the third on-time is turned off forms the second duration T2. Further, an off-time in which the second switch SW2 turns off is inserted between the first and second on-times and between the second and third on-times, so that the second duration T2 is longer than three times of the second continuous on-time To2 (T2>3×To2).

Though the second duration T2 is provided with off-times in which the second switch SW2 is turned off between adjacent second continuous on-times To2 in which the second switch SW2 is turned on, it is not necessary to provide this off-time. In this case, the second duration T2 is three times as long as the second continuous on-time To2 (T2=3×To2).

Similarly, when the first switch SW1 is turned on multiple times in the first duration T1, an off-time in which the first switch SW1 is turned off may be either inserted or not between adjacent first continuous on-times To1 in which the first switch SW1 is turned on.

When the first switch SW1 is turned on, the positive polarity voltage (negative voltage) is applied across the electrode gap EG, and when the second switch SW2 is turned on, the reverse polarity voltage (positive voltage) is applied across the electrode gap EG. Since the first switch SW1 is turned on in the first duration T1 and the second switch SW2 is turned on in the second duration T2, during the first duration T1 the positive voltage is applied across the electrode gap EG, and during the second duration T2 the reverse polarity voltage is applied across the electrode gap EG.

Although an off-time (a period during which both the first switch SW1 and the second switch SW2 are off) in which no voltage is applied across the electrode gap EG is provided between the first duration T1 and the second duration T2, this off-time may be omitted.

When the first duration T1 is changed by the duration setting changer 66, the switch controller 62 may change the first continuous on-time To1 or the number of times N1 the first switch SW1 is turned on, accordingly. Further, when the second duration T2 is changed by the duration setting changer 66, the switch controller 62 may change the second continuous on-time To2 accordingly, or may change the number of times N2 the second switch SW2 is turned on.

<Second Switch Control Method>

In the second switch control method, one on-time (first continuous on-time) To1 of the first switch SW1 is equal to the first time period T1 (To1=T1) and one on-time of the second switch SW2 (second continuous on-time) To2 is equal to the second duration T2 (To2=T2). At this time, it is preferable that the first duration T1 (=the first continuous on-time To1) and the second duration T2 (=the second continuous on-time To2) satisfy a relationship of (first duration T1)/(second duration T2)=(reverse polarity voltage)/(positive polarity voltage).

Figure 4:
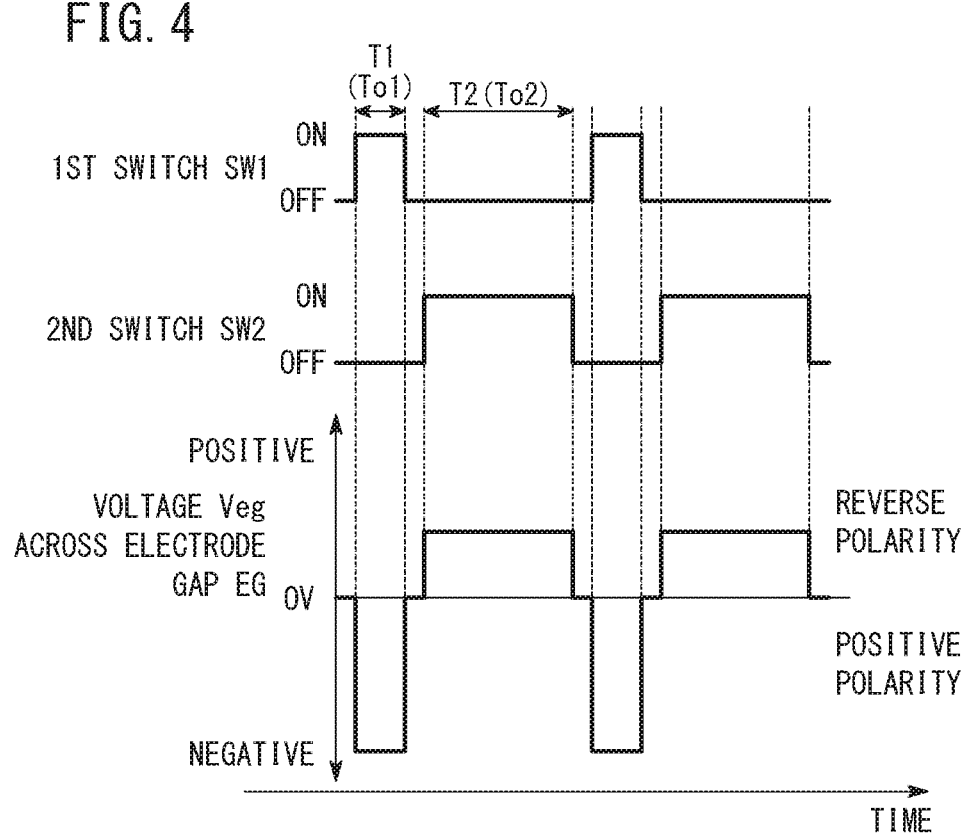
FIG. 4 is a time chart showing the voltage across the electrode gap when a switch controller controls the first switch and the second switch by a second switching control method.

FIG. 4 is a time chart showing the voltage Veg across the electrode gap EG when the switch controller 62 controls the first switch SW1 and the second switch SW2 according to the second switch control method. In the example shown in FIG. 4, the ratio between the first duration T1 (=the first continuous on-time To1) and the second duration T2 (=the second continuous on-time To2) is set to be about 1:3 and the ratio between the absolute value of the positive polarity voltage and the absolute value of the reverse polarity voltage is set to be about 3:1.

In order to make it easy to grasp the application of voltage across the electrode gap EG by the switching of the first switch SW1 and the second switch SW2, FIG. 4 too shows a state in which no sparks are occurring across the electrode gap EG even when the positive polarity voltage and the reverse polarity voltage are applied at the electrode gap EG.

As can be seen from FIG. 4, the switch controller 62 controls the first switch SW1 and the second switch SW2 so as to alternate the first duration T1 for applying the positive polarity voltage and the second duration T2 for applying the reverse polarity voltage. In the example shown in FIG. 4, the second duration T2 (the second continuous on-time To2) in which the second switch SW2 is turned on is set about three times longer than the first duration T1 (the first continuous on-time To1) in which the first switch SW1 is turned on. The reason is that the ratio between the absolute value of the positive polarity voltage and the absolute value of the reverse polarity voltage is about 3:1 and even in that case the average voltage Va across the electrode gap EG is kept around 0V (the target voltage).

When the first switch SW1 is turned on, the positive polarity voltage (negative voltage) is applied across the electrode gap EG, and when the second switch SW2 is turned on, the reverse polarity voltage (positive voltage) is applied across the electrode gap EG. Since the first switch SW1 is turned on in the first duration T1 and the second switch SW2 is turned on in the second duration T2, during the first duration T1 the positive voltage is applied across the electrode gap EG, and during the second duration T2 the reverse polarity voltage is applied across the electrode gap EG.

Although an off-time (a period during which both the first switch SW1 and the second switch SW2 are off) in which no voltage is applied across the electrode gap EG is provided between the first duration T1 and the second duration T2, this off-time may be omitted.

Figure 5:
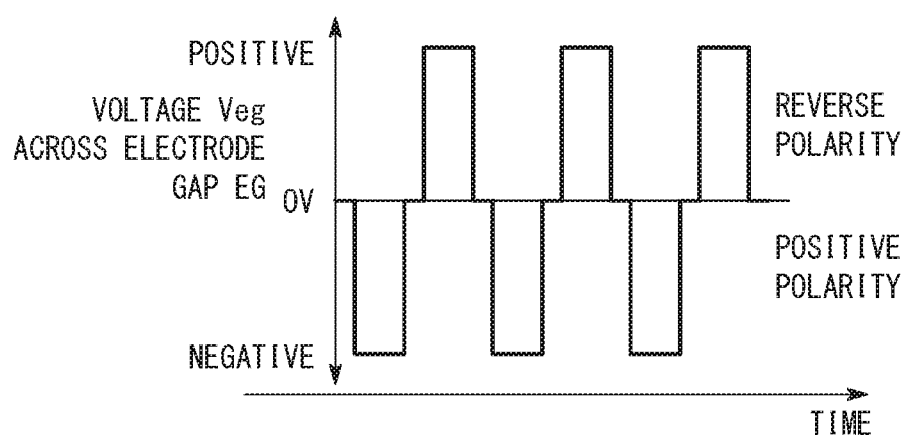
FIG. 5 is a diagram showing a waveform of a voltage applied across a conventional electrode gap.
Figure 6:
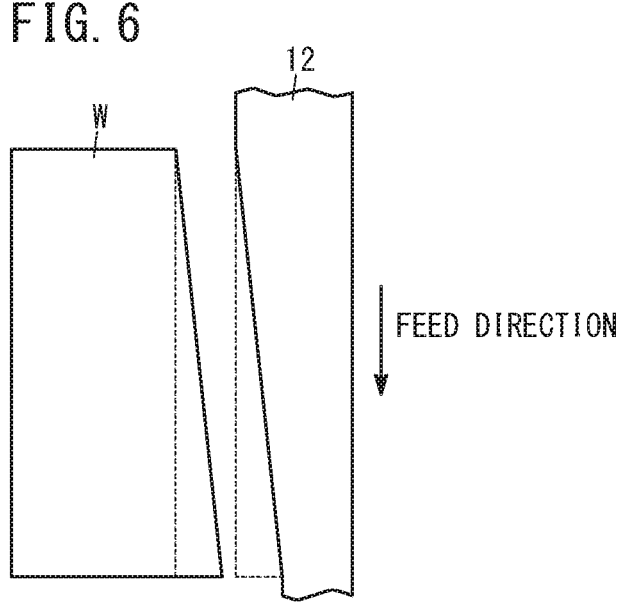
FIG. 6 is a view showing the shapes of a workpiece and a wire electrode reduced by the voltage of the waveform shown in FIG. 5.
Figure 7:
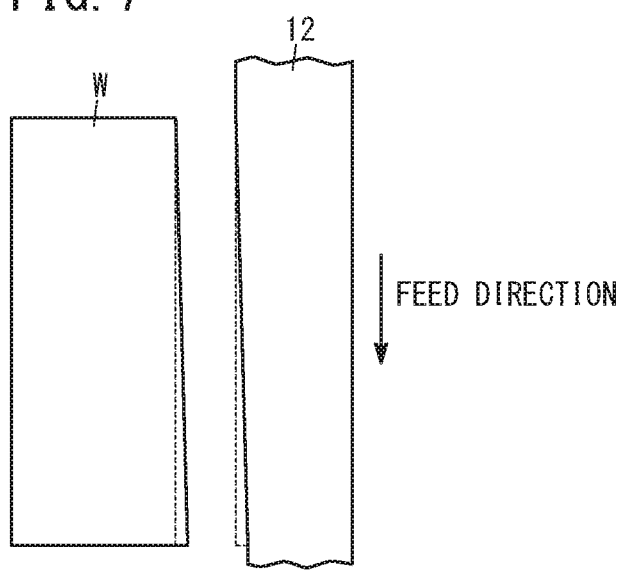
FIG. 7 is a view showing the shapes of a workpiece and a wire electrode reduced by the voltage of the waveform shown in FIG. 3 or FIG. 4.

Now, the effect obtained by the wire electrical discharge machine 10 of the present embodiment will be described as compared with the conventional one. FIG. 5 is a diagram showing a waveform of voltage applied across a conventional electrode gap EG. FIG. 6 is a diagram showing the shapes of a workpiece W and a wire electrode 12 reduced by the voltage Veg having a waveform shown in FIG. 5. Further, FIG. 7 is a diagram showing the shapes of a workpiece W and a wire electrode 12 reduced by the voltage Veg having a waveform shown in FIG. 3 or FIG. 4. The dotted line on the workpieces W in FIG. 6 and FIG. 7 represent a machining target surface obtained by the machining according to a planned design, and the dotted line on the wire electrode 12 represents the wear in the wire electrode 12.

In the prior art, for example a positive polarity voltage and a reverse polarity voltage having the same absolute value (magnitude) are alternately applied across the electrode gap EG (see FIG. 5). Therefore, when such voltage is applied to the electrode gap EG and electric discharge occurs, a portion of the workpiece W closer to top face of the workpiece W is machined by the wire electrode 12 that has been less exhausted and a lower portion of the workpiece W is machined by the wire electrode that has been more exhausted (see FIG. 6). For this reason, the upper part of the object W can be machined as desired by the wire electrode 12, but the lower portion is not satisfactorily machined, leaving a large volume that is supposed to have been machined. As a result, the lower part of the workpiece W becomes thicker compared to the upper part thereof, thereby deteriorating the machining accuracy.

On the other hand, since, in the wire electrical discharge machine 10 of the present embodiment, the absolute value (magnitude) of the reverse polarity voltage is set smaller than the absolute value (magnitude) of the positive polarity voltage, it is possible to make the number of electrical discharges arising at the time of application of the reverse polarity voltage across the electrode gap EG less than that at the time of application of the positive polarity voltage across the electrode gap EG. In addition, even when sparking occurs when the reverse polarity voltage is applied across the electrode gap EG, consumption of the wire electrode 12 can be suppressed because the machining energy is low. Therefore, as shown in FIG. 7 the wear of the wire electrode 12 is also mitigated in the lower part of the workpiece W, so that the lower part of the workpiece W can be also machined with high accuracy, whereby deterioration of machining accuracy can be prevented. Further, it is possible to reliably prevent occurrence of electrolytic phenomena and electrolytic corrosion on the workpiece W.

Figure 8:
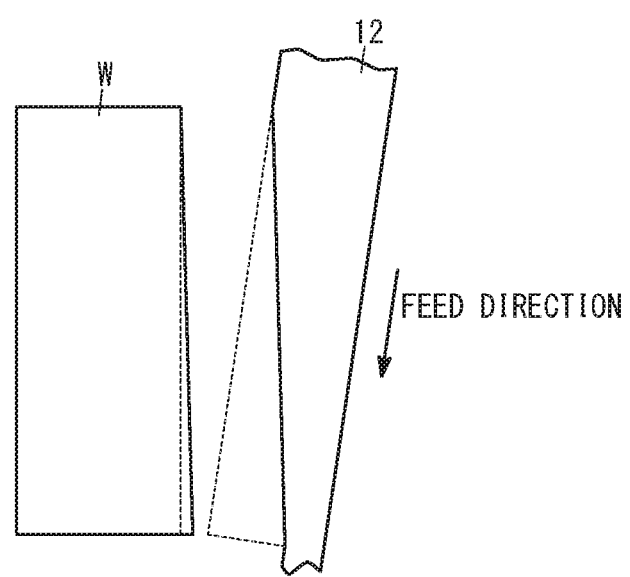
FIG. 8 is a view showing the shapes of a workpiece and a wire electrode in a case where the wire electrode is inclined in accordance with the predicted wear amount of the wire electrode.

When the conventional voltage applying method as shown in FIG. 5 is used, in order to improve the machining accuracy it is possible to use a technique in which the amount of consumption of the wire electrode 12 is predicted so as to incline the wire electrode 12 with respect to its moving direction (feed direction) in accordance with the predicted amount of consumption of the wire electrode 12. As a result, as shown in FIG. 8 it is possible to make the side face of the wire electrode 12 opposing the workpiece W approximately parallel to the machining target surface of the planned design on the workpiece W. However, it is difficult to predict the amount of consumption of the wire electrode 12. Besides it is necessary and time-consuming to adjust the inclination of the wire electrode 12 every time the machining condition is changed. In a case of a workpiece W having varying plate thickness, if the inclination of the wire electrode 12 is determined in accordance with the thickest part of the workpiece (=the part where the wire electrode 12 has been most worn out), the inclination becomes excessive around the portion where the workpiece W becomes thinner than the half of the thickest part, thereby resulting in accuracy degradation. As can be seen, it is very difficult to find the optimal inclination in actual machining. In contrast to this, according to the present embodiment, there is no need to predict the amount of consumption of the wire electrode 12 to incline the wire electrode 12, thereby saving time and labor. Here, the meanings of dotted lines drawn on the workpiece W and the wire electrode 12 in FIG. 8 are the same as those in FIGS. 6 and 7.

VARIATIONAL EXAMPLE

The above embodiment may be modified as follows.

Variational Example 1

Figure 9:
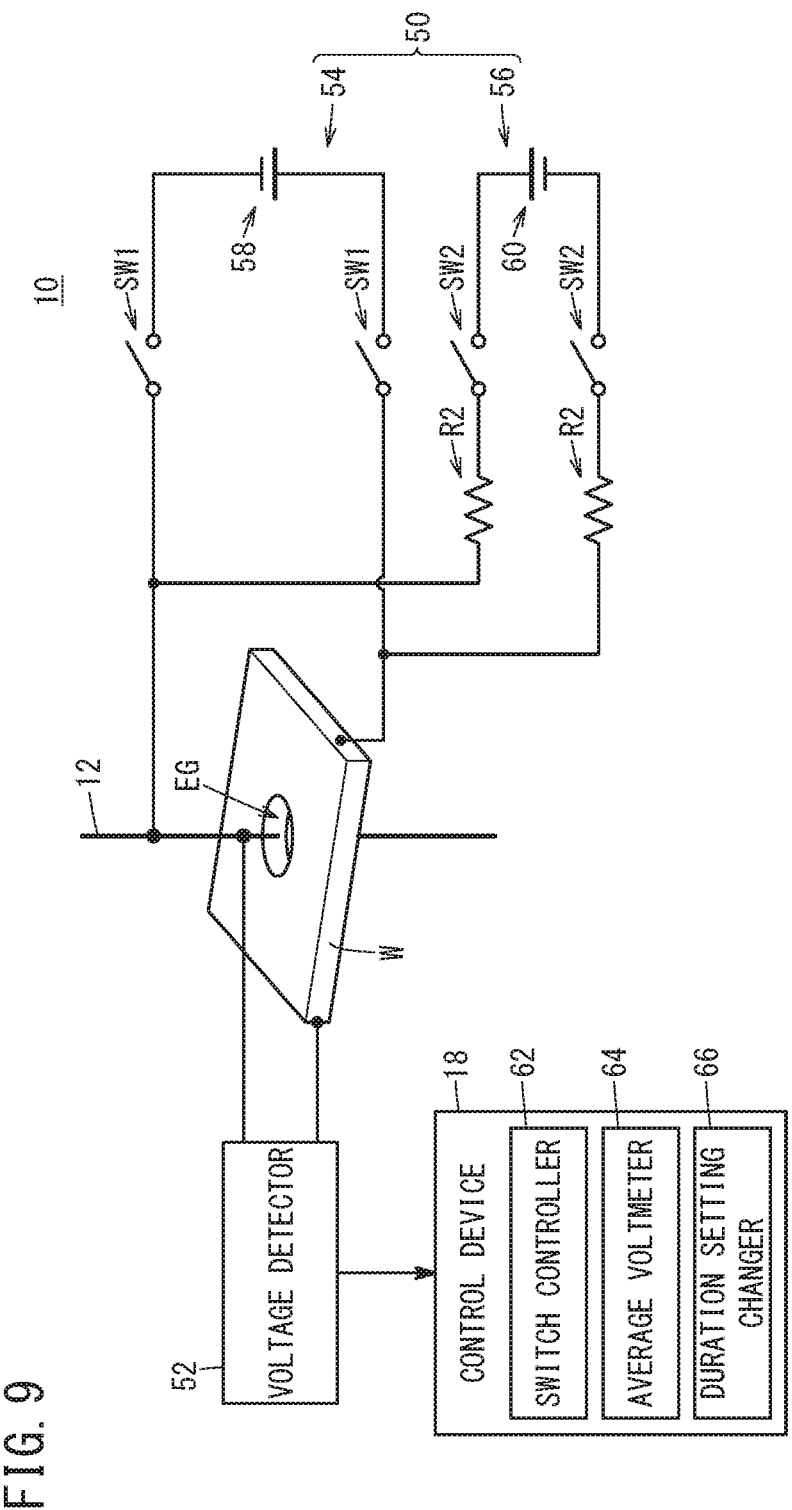
FIG. 9 is an electrical circuit configuration diagram of a wire electrical discharge machine in a variational example 1.

FIG. 9 is an electrical circuit configuration diagram of the wire electrical discharge machine 10 in a variational example 1. The same components as those in the above embodiment are allotted with the same reference numerals, and only different components will be described.

In the variational example 1, the second voltage applying circuit 56 for applying reverse polarity voltage to the electrode gap EG further includes current limiting resistors R2 inserted between the second DC power source 60 and the electrode gap EG. Specifically, each of the current limiting resistors R2 is inserted between the second switch SW2 and the electrode gap EG. That is, one current limiting resistor R2 is inserted between the second switch SW2 connected to the positive electrode of the second DC power source 60 and the wire electrode 12, and the other between the second switch SW2 connected to the negative electrode of the second DC power source 60 and the workpiece W.

The current limiting resistor R2 may be provided between the second switch SW2 and the second DC power source 60. That is, one current limiting resistor R2 is inserted between the second switch SW2 connected to the positive electrode of the second DC power source 60 and the positive electrode of the second DC power source 60, and the other between the second switch SW2 connected to the negative electrode of the second DC power source 60 and the negative electrode of the second DC power source 60. In the example shown in FIG. 9, the current limiting resistor R2 is provided both between the positive electrode of the second DC power source 60 and the wire electrode 12 and between the negative electrode of the second DC power source 60 and the workpiece W. However, only one current limiting resistor R2 may be provided at one of the locations above.

Provision of this current limiting resistor R2 makes it possible to suppress consumption of the wire electrode 12 more efficiently even when electrical discharge takes place due to application of the reverse polarity voltage across the electrode gap EG (by turning on the second switch SW2). That is, since provision of the current limiting resistor R2 reduces (limit) the discharge current flowing through the electrode gap EG upon sparking, consumption of the wire electrode 12 can be suppressed.

Similarly, the first voltage applying circuit 54 for applying the positive polarity voltage across the electrode gap EG may also have current limiting resistors R1 (not shown) inserted between the first DC power source 58 and the electrode gap EG. The current limiting resistor R1 may be inserted between the first switch SW1 and the electrode gap EG, or may be inserted between the first switch SW1 and the first DC power source 58. The current limiting resistors R1 may be provided between the positive electrode of the first DC power source 58 and the wire electrode 12 and between the negative electrode of the first DC power source 58 and the workpiece W, respectively, or may be provided for only either one the locations above. In this case, the resistance value of the current limiting resistor R1 is set to be equal to or lower than that of the current limiting resistor R2. This is because when the current limiting resistor R1 excessively limits the current flowing through the electrode gap EG under the application of the positive polarity voltage across the electrode gap EG (by turning on the first switch SW1), the machining speed of the workpiece W decreases.

Variational Example 2

Figure 10:
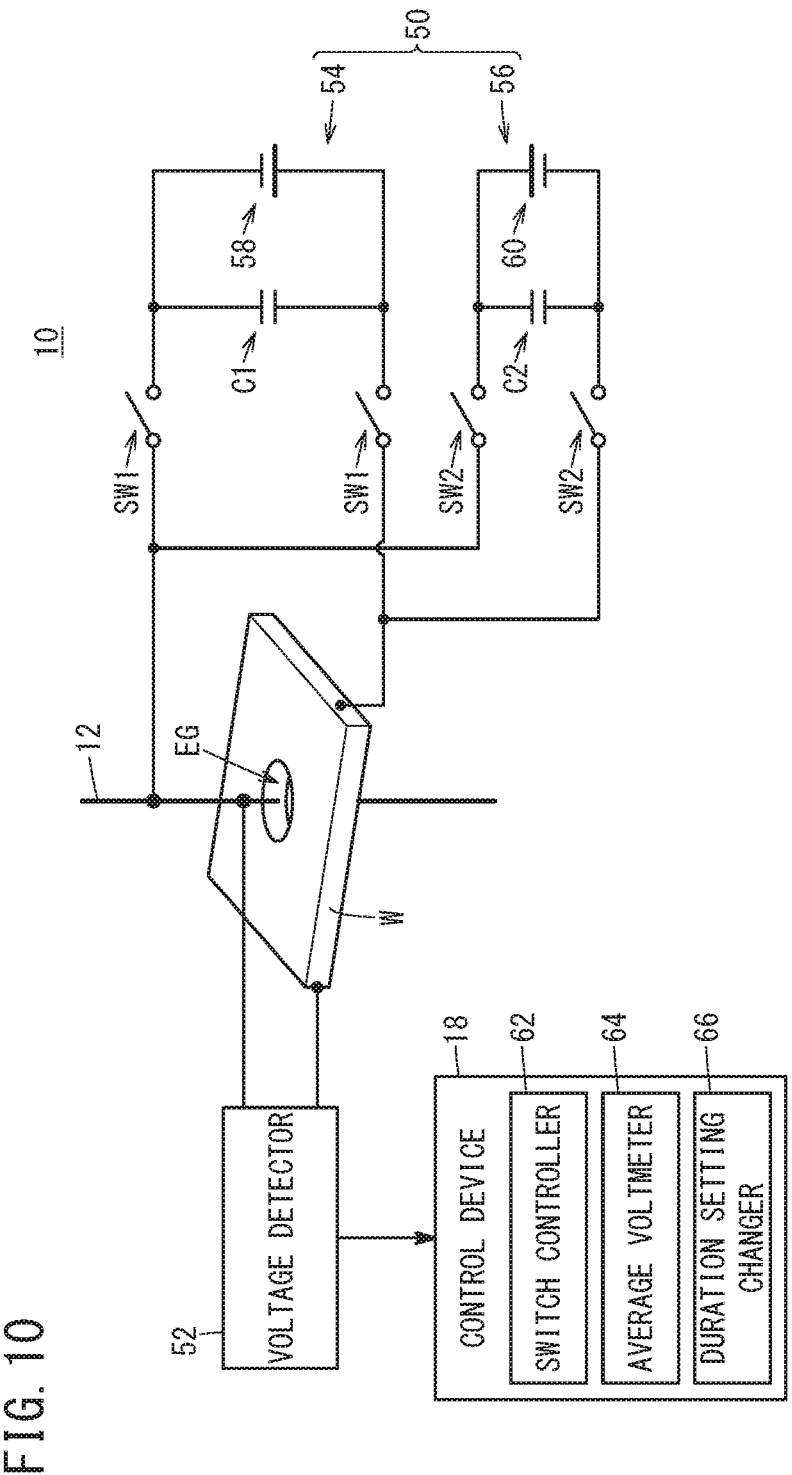
FIG. 10 is an electric circuit configuration diagram of a wire electrical discharge machine in a variational example 2.

FIG. 10 is an electrical circuit configuration diagram of the wire electrical discharge machine 10 in a variational example 2. The same components as those in the above embodiment are allotted with the same reference numerals, and only different components will be described.

In the variational example 2, the first voltage applying circuit 54 that applies positive voltage across the electrode gap EG further includes a first capacitor C1 connected in parallel with the first DC power source 58. The second voltage applying circuit 56 that applies reverse polarity voltage across the electrode gap EG further includes a second capacitor C2 connected in parallel with the second DC power source 60. Specifically, the first capacitor C1 is provided between the first switches SW1 and the first DC power source 58, and the second capacitor C2 is provided between the second switches SW2 and the second DC power source 60. Since the first switches SW1 and the first DC power source 58 are arranged at positions a certain distance away from each other, the first capacitor C1 is preferably arranged near the first switches SW1. Similarly, since the second switch SW2 and the second DC power source 60 are arranged at positions a certain distance away from each other, the second capacitor C2 is preferably arranged near the second switches SW2.

The first capacitor C1 is to stabilize the positive polarity voltage applied across the electrode gap EG and the second capacitor C2 is to stabilize the reverse polarity voltage applied across the electrode gap EG. The capacitance of the first capacitor C1 is equal to or greater than that of the second capacitor C2. The capacitance of the first capacitor C1 is greater than that required to stabilize the positive voltage. This makes it possible to increase the discharge current (machining current) flowing through the electrode gap EG by the application of the positive polarity voltage across the electrode gap EG, thereby increasing the machining amount and improving the machining efficiency. In addition, it is preferable to set the capacitance of the second capacitor C2 at the minimum capacitance necessary to stabilize the reverse polarity voltage. This makes it possible to suppress the discharge current flowing through the electrode gap EG by the application of the reverse polarity voltage across the electrode gap EG and to suppress the consumption of the wire electrode 12. Here, either the first capacitor C1 or the second capacitor C2 may be provided alone.

Variational Example 3

In the above embodiment, the switch controller 62 controls the first switch SW1 and the second switch SW2 so as to switch the first duration T1 and the second duration T2 set in advance, in an alternate manner. However, in a variational example 3, the first duration T1 for applying positive voltage and the second duration T2 for applying reverse polarity voltage have not been determined. That is, based on the average voltage Va across the electrode gap EG, the polarity of the voltage to be applied next is determined. Here, it is assumed that the first continuous on-time To1 of the first switch SW1 and the second continuous on-time To2 of the second switch SW2 is determined beforehand.

Figure 11:
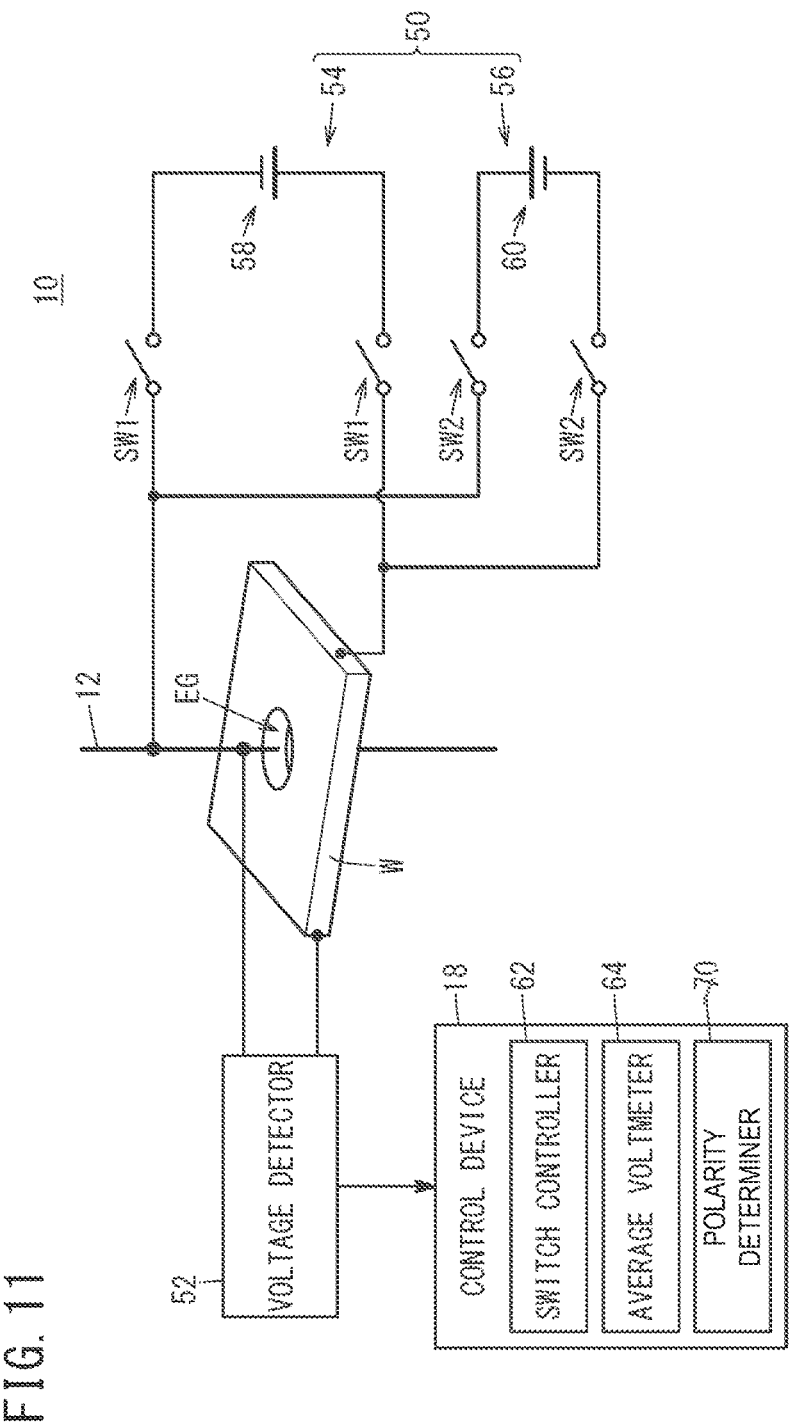
FIG. 11 is an electrical circuit configuration diagram of a wire electrical discharge machine in a variational example 3.

FIG. 11 is an electrical circuit configuration diagram of the wire electrical discharge machine 10 in the variational example 3. The same components as those in the above embodiment are allotted with the same reference numerals, and only different components will be described.

The control device 18 includes the switch controller 62, the average voltmeter 64, and a polarity determiner 70. The polarity determiner 70 compares the average voltage Va measured by the average voltmeter 64 with a target voltage. Based on the comparison result, the polarity determiner 70 determines the polarity that makes the average voltage Va approach the target voltage, and selects the polarity to be applied to the electrode gap EG next. For example, when the average voltage Va is lower than the target voltage, the polarity of voltage to make the average voltage Va closer (up) to the target voltage is reverse polarity. Accordingly, the polarity determiner 70 selects reverse polarity as the polarity to be applied to the electrode gap EG next. Also, when the average voltage Va is higher than the target voltage, the polarity of voltage to make the average voltage Va closer (down) to the target voltage is positive polarity. Accordingly, the polarity determiner 70 selects positive polarity as the polarity to be applied to the electrode gap EG next.

The switch controller 62 applies voltage of the polarity determined by the polarity determiner 70 to the electrode gap EG. That is, when the application of the voltage currently applied across the electrode gap EG ends, the voltage of the polarity determined by the polarity determiner 70 is applied to the electrode gap EG. For example, when the polarity selected by the polarity determiner 70 is positive, the switch controller 62 turns on the first switch SW1 only during the first continuous on-time To1, to thereby apply the positive polarity voltage to the electrode gap EG. When the polarity determined by the polarity determiner 70 is reverse polarity, the switch controller 62 turns on the second switch SW2 only during the second continuous on-time To2, so as to apply the reverse polarity voltage to the electrode gap EG.

As described above, the polarity determiner 70 determines which polarity of voltage is applied to the electrode gap EG next, based on the comparison result between the current average voltage Va across the electrode gap EG and the target voltage, so that it is possible to set the average voltage Va to the target voltage. Therefore, by setting the target voltage at, for example, 0V, it is possible to definitely prevent occurrence of electrolytic phenomena and electrolytic corrosion of the workpiece W.

Variational Example 4

Figure 12:
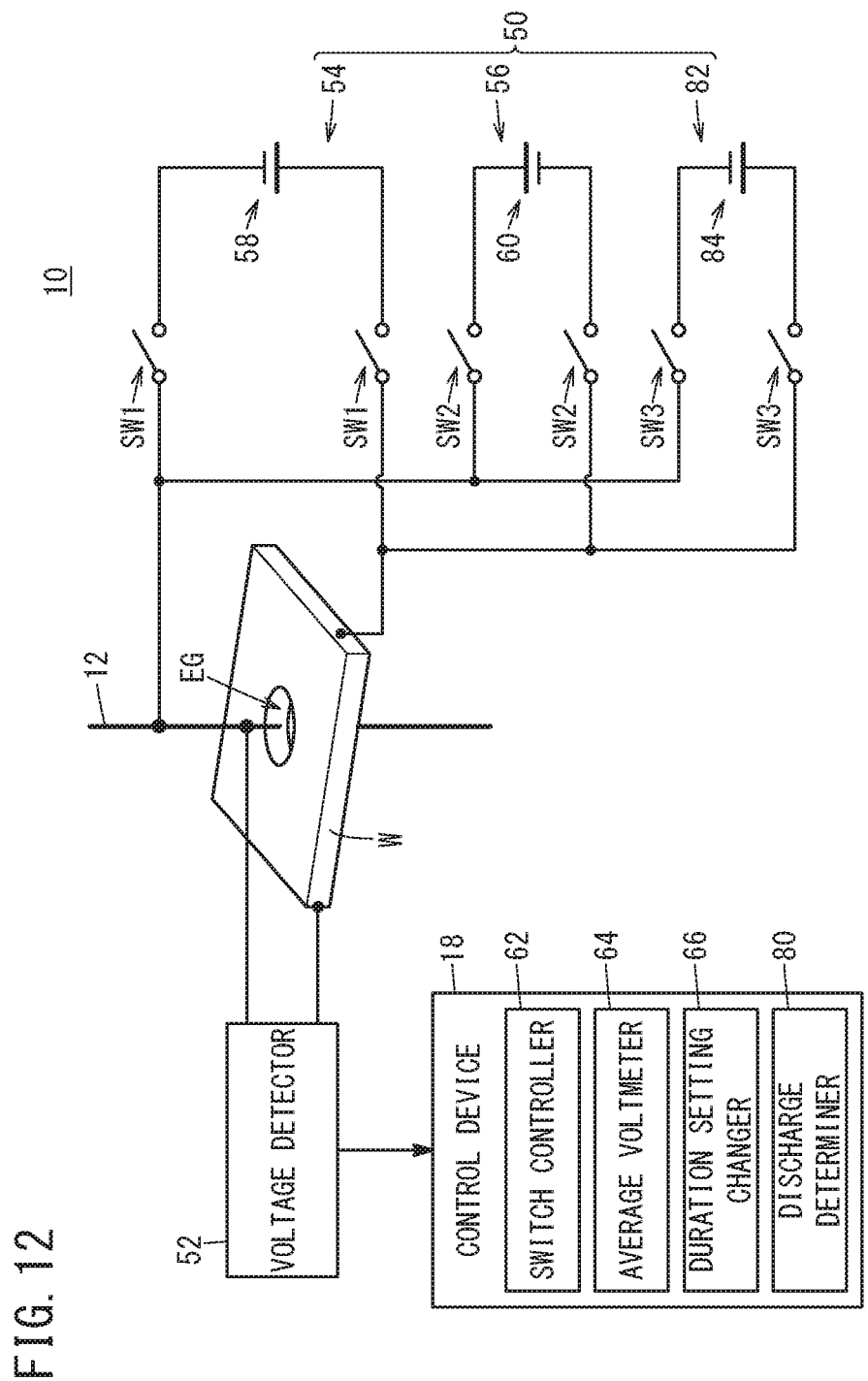
FIG. 12 is an electrical circuit configuration diagram of a wire electrical discharge machine in a variational example 4.

FIG. 12 is an electrical circuit configuration diagram of the wire electrical discharge machine 10 in a variational example 4. The same components as those in the above embodiment are allotted with the same reference numerals, and only different components will be described.

In the variational example 4, the control device 18 further includes a discharge determiner 80 in addition to the switch controller 62, the average voltmeter 64, and the duration setting changer 66. The discharge determiner 80 determines whether or not a spark has occurred across the electrode gap EG while the first voltage applying circuit 54 or the second voltage applying circuit 56 is applying voltage (positive polarity voltage or reverse polarity voltage) to the electrode gap EG. The discharge determiner 80 determines occurrence of electric discharge based on the voltage Veg detected by the voltage detector 52. Specifically, the discharge determiner 80 determines that electric discharge has occurred when the absolute value of the voltage Veg detected by the voltage detector 52 lowers to a predetermined level while the first voltage applying circuit 54 or the second voltage applying circuit 56 is applying voltage (positive polarity voltage or reverse polarity voltage) to the electrode gap EG. When discharge occurs, the voltage (absolute value) across the electrode gap EG lowers to the arc voltage.

Further, in a variational example 4, the machining power source 50 further includes a third voltage applying circuit 82 in addition to the first voltage applying circuit 54 and the second voltage applying circuit 56. In order to apply a main cutting volt of positive polarity between the workpiece W side as the positive electrode and the wire electrode 12 side as the negative electrode, the third voltage applying circuit 82 includes: a third DC power source 84 connected across the electrode gap EG; and third switches SW3 provided between the third DC power source 84 and the electrode gap EG to perform on/off switching of application of the main cutting volt to the electrode gap EG. In FIG. 12 a pair of third switches SW3 are provided between the positive electrode of the third direct-current power source 84 and the workpiece W and between the negative electrode of the third direct-current power source 84 and the wire electrode 12 but only one third switches SW3 may be provided at one of the locations above.

The third DC power source 84 applies to the electrode gaps EG a greater voltage (absolute value) than the voltages (absolute value) applied to the electrode gaps EG by the first DC power source 58 and the second DC power source 60, in order to flow a main machining current that is a large discharge current (machining current) through the electrode gap EG. This current enables an increased amount of the reducing of the workpiece W.

When the discharge determiner 80 determines that a spark has occurred after start of application of either the positive polarity voltage or the reverse polarity voltage (after turning on the first switch SW1 or the second switch SW2) until the application is ended (the first switch SW1 or the second switch SW2 is turned off), the switch controller 62 turns on the third switch SW3 to apply the main cutting volt (positive polarity) across electrode gap EG and supply the main machining current therethrough.

At the time of roughing (the first machining, initial machining) and at the time of the second machining at a high machining speed, it is necessary to increase the amount of machining in the workpiece W. Therefore, at the time of roughing and the second machining with a high speed, when a spark takes places during application of positive polarity voltage or reverse polarity voltage, the switch controller 62 turns on the third switch SW3 to apply the main cutting voltage to electrode gap EG across which arc discharge is being generated and to flow the main machining current therethrough. Since the main cutting volt is of positive polarity, that is, the workpiece W serves as a positive electrode and the wire electrode 12 serves a negative electrode, the roughing or the second machining as conventionally done can be performed with an advantage that exhaustion of the wire electrode 12 is suppressed.

The switch controller 62 turns on the third switch SW3 for a predetermined third continuous on-time To3 to apply the main cutting volt to the electrode gap EG. After the third switch SW3 is turned on and the main cutting volt is applied to the electrode gap EG to flow the main machining current, the switch controller 62 turns off all the first switch SW1 to the third switch SW3 to form a pause time. That is, when the third continuous on-time To3 has elapsed, the switch controller 62 turns off the third switch SW3 and also turns off the first switch SW1 and the second switch SW2. Then, when the pause time elapses after the first switch SW1 to the third switch SW3 are turned off, one of the first switch SW1 and the second switch SW2 is turned on so as to apply the positive polarity voltage or the reverse polarity voltage to the electrode gap EG.

For example, in the case of the above-described embodiment and variational examples 1 and 2, after the pause time has elapsed, the switch controller 62 restarts control of the first switch SW1 and the second switch SW2 so as to alternate the first duration T1 and the second duration T2. Further, in the case of the above third variational example, after the pause time has elapsed, the switch controller 62 restarts control of the first switch SW1 and the second switch SW2 in accordance with the average voltage Va and the target voltage across the electrode gap EG.

In finishing, as described in the above embodiment or variational examples 1 to 3, the machining may be performed by application of the positive polarity voltage from the first voltage applying circuit 54 and application of the reverse polarity voltage from the second voltage applying circuit 56 alone.

Variational Example 5

Any embodied mode obtained by combination of two or more of variational examples 1 to 4 can be employed as long as there occurs no incompatibility.

As described above, the wire electrical discharge machine 10 described in the above embodiment and variational examples 1 to 5 applies a voltage across the electrode gap EG formed between the wire electrode 12 and the workpiece W to generate electric discharge, and thereby implement electrical discharge machining on the workpiece W.

An electrical discharge machine 10 includes a first voltage applying circuit 54, a second voltage applying circuit 56, and a switch controller 62. The first voltage applying circuit 54 includes a first DC power source 58 connected across the electrode gap EG so as to apply a positive polarity voltage with the workpiece W side being the positive electrode and the wire electrode 12 side being the negative electrode, and a first switch SW1 arranged between the first DC power source 58 and the electrode gap EG and configured to perform on/off switching control of applying the positive polarity voltage across the electrode gap EG. The second voltage applying circuit 56 includes a second DC power source 60 connected across the electrode gap EG so as to apply a reverse polarity voltage with the wire electrode 12 side being the positive electrode and the workpiece W side being the negative electrode, and a second switch SW2 arranged between the second DC power source 60 and the electrode gap EG and configured to perform on/off switching control of applying the reverse polarity voltage across the electrode gap EG. The switch controller 62 performs on/off control of the first switch SW1 and the second switch SW2 and controls the first switch SW1 and the second switch SW2 such that the first switch SW1 and the second switch SW2 will not turn on at the same time. The first DC power source 58 and the second DC power source 60 are configured so that the absolute value of the reverse polarity voltage is lower than the absolute value of the positive polarity voltage.

Since the first DC power source 58 and the second DC power source 60 are set so that the absolute value of the reverse polarity voltage is lower than the absolute value of the positive polarity voltage, it is possible to suppress consumption of the wire electrode 12 and thus prevent deterioration of machining accuracy. In addition, since the positive polarity voltage and the reverse polarity voltage are applied across the electrode gap EG, it is possible to prevent occurrence of electrolytic phenomena and electrolytic corrosion on the workpiece W.

The switch controller 62 may control the first switch SW1 and the second switch SW2 so as to alternate a first duration T1 for applying the positive polarity voltage across the electrode gap EG and a second duration T2 for applying the reverse polarity voltage across the electrode gap EG.

In this way, it becomes possible to suppress consumption of the wire electrode 12 and prevent deterioration of machining accuracy as well as to prevent occurrence of electrolytic phenomena and electrolytic corrosion on the workpiece W.

The second duration T2 may be set to be longer than the first duration T1. This configuration further makes it possible to prevent occurrence of electrolytic phenomena and electrolytic corrosion on the workpiece W.

The wire electrical discharge machine 10 may include a voltage detector 52, an average voltmeter 64, and a duration setting changer 66. The voltage detector 52 detects a voltage Veg across the electrode gap EG. The average voltmeter 64 measures an average voltage Va across the electrode gap EG based on the voltage Veg across the electrode gap EG detected by the voltage detector 52. The duration setting changer 66 changes at least one of the first duration T1 and the second duration T2 so that the average voltage Va across the electrode gap EG measured by the average voltmeter 64 approaches a target voltage.

Thereby, it is possible to make the average voltage Va across the electrode gap EG approach the target voltage. Accordingly, it is possible to prevent deterioration of machining accuracy while further suppressing consumption of the wire electrode 12. In addition, it is possible to further prevent occurrence of electrolytic phenomena and electrolytic corrosion on the workpiece W.

A first continuous on-time To1 as one unit of the on-time of the first switch SW1 and a second continuous on-time To2 as one unit of the on-time of the second switch SW2 may have been determined previously, and the first continuous on-time To1 may be a length equal to or shorter than the first duration T1 and the second continuous on-time To2 may be equal to or shorter than the second duration T2. The switch controller 62 may turn on the first switch SW1 once or multiple times in the first duration T1 so as to apply the positive polarity voltage across the electrode gap EG and turn on the second switch SW2 once or multiple times in the second duration T2 so as to apply the reverse polarity voltage across the electrode gap EG. Further, the first continuous on-time To1 and the second continuous on-time To2, the number of times N1 the first switch SW1 is turned on in the first duration T1 and the number of times N2 the second switch SW2 is turned on in the second duration T2 may be designated so that the time for which the reverse polarity voltage is actually applied across the electrode gap EG in the second duration T2 is longer than the time for which the positive polarity voltage is actually applied across the electrode gap EG in the first duration T1.

This makes it possible to make the time for which the reverse polarity voltage of a lower absolute value is actually applied to the electrode gap EG longer than the time for which the positive polarity voltage of a higher absolute value is actually applied to the electrode gap EG. Accordingly, it is possible to prevent deterioration of machining accuracy while further suppressing consumption of the wire electrode 12. In addition, it is possible to further prevent occurrence of electrolytic phenomena and electrolytic corrosion on the workpiece W.

Further, one unit of the on-time of the first switch SW1 may be the first duration T1 and one unit of the on-time of the second switch SW2 may be the second duration T2. The switch controller 62 may set the first switch SW1 in an on-state in the first duration T1 and set the second switch SW2 in the on-state in the second duration T2.

This makes it possible to make the time for which the reverse polarity voltage of a lower absolute value is actually applied to the electrode gap EG longer than the time for which the positive polarity voltage of a higher absolute value is actually applied to the electrode gap EG. Accordingly, it is possible to prevent deterioration of machining accuracy while further suppressing consumption of the wire electrode 12. In addition, it is possible to further prevent occurrence of electrolytic phenomena and electrolytic corrosion on the workpiece W.

A first continuous on-time To1 as one unit of the on-time of the first switch SW1 and a second continuous on-time To2 as one unit of the on-time of the second switch SW2 may have been determined previously. The wire electrical discharge machine 10 may include a voltage detector 52, an average voltmeter 64, and a polarity determiner 70. The polarity determiner 70 compares the average voltage Va across the electrode gap EG measured by the average voltmeter 64 with a target voltage, determines the polarity that makes the average voltage Va approach the target voltage, and selects the polarity to be applied next. The switch controller 62 may control the first switch SW1 and the second switch SW2 so as to apply the voltage of the polarity determined by the polarity determiner 70.

Thereby, it is possible to make the average voltage Va across the electrode gap EG closer to the target voltage. Accordingly, it is possible to prevent deterioration of machining accuracy while further suppressing consumption of the wire electrode 12. In addition, it is possible to further prevent occurrence of electrolytic phenomena and electrolytic corrosion on the workpiece W.

The second voltage applying circuit 56 may further include a current limiting resistor R2 inserted between the second DC power source 60 and the electrode gap EG. As a result, it is possible to more effectively suppress consumption of the wire electrode 12 even when electrical discharge has occurred due to application of the reverse polarity voltage to the electrode gap EG (the second switch SW2 being turned on).

The first voltage applying circuit 54 may include a first capacitor C1 connected in parallel with the first DC power source 58, and the second voltage applying circuit 56 may include a second capacitor C2 connected in parallel to the second DC power source 60. In this case, the capacitance of the first capacitor C1 may be set equal to or higher than the capacitance of the second capacitor C2. This configuration makes it possible to increase the discharge current (machining current) flowing through the electrode gap EG as a result of application of the positive polarity voltage to the electrode gap EG, thereby increasing the machining amount and improving the machining efficiency. In addition, it is possible to suppress the discharge current flowing through the electrode gap EG as a result of application of the reverse polarity voltage to the electrode gap EG and thus to suppress the consumption of the wire electrode 12.

The wire electrical discharge machine 10 may further include a voltage detector 52, a discharge determiner 80, and a third voltage applying circuit 82. The discharge determiner 80 determines whether or not electrical discharge has occurred based on the voltage Veg across the electrode gap EU detected by the voltage detector 52. The third voltage applying circuit 82 includes a third DC power source 84 connected across the electrode gap EG so as to apply a main cutting volt of positive polarity where the workpiece W side acting as the positive electrode and the wire electrode 12 side acting as the negative electrode, and a third switch SW3 provided between the third DC power source 84 and the electrode gap EG to perform on/off switching of application of the main cutting voltage to the electrode gap EU. When the discharge determiner 80 determines that electrical discharge has occurred during the period from the start of application of either one of the positive polarity voltage or the reverse polarity voltage to the end of the application, the switch controller 62 may turn on the third switch SW3 to apply the main cutting voltage across the electrode gap EG to flow main machining current therethrough. As a result, it is possible to increase the machining amount of the workpiece W while suppressing consumption of the wire electrode 12.

The present invention is not limited to the above-described embodiments, and may be freely modified without departing from the essence and gist of the present invention.

What is claimed is:

1. An electrical discharge machine for performing electrical discharge machining on a workpiece by applying voltage across an electrode gap formed between a wire electrode and the workpiece, comprising:
   a first voltage applying circuit including a first DC power source connected across the electrode gap so as to apply a positive polarity voltage with a workpiece side being a positive electrode and a wire electrode side being a negative electrode, and a first switch arranged between the first DC power source and the electrode gap and configured to perform on/off switching control of applying the positive polarity voltage across the electrode gap;
   a second voltage applying circuit including a second DC power source connected across the electrode gap so as to apply a reverse polarity voltage with a wire electrode side being a positive electrode and a workpiece side being a negative electrode, and a second switch arranged between the second DC power source and the electrode gap and configured to perform on/off switching control of applying the reverse polarity voltage across the electrode gap; and,
   a switch controller configured to perform on/off control of the first switch and the second switch and control the first switch and the second switch such that the first switch and the second switch are not turned on simultaneously,
   wherein the first DC power source and the second DC power source are configured so that an absolute value of the reverse polarity voltage is always lower than an absolute value of the positive polarity voltage.

2. The wire electrical discharge machine according to claim 1, wherein the switch controller controls the first switch and the second switch so as to alternate a first duration for applying the positive polarity voltage across the electrode gap and a second duration for applying the reverse polarity voltage across the electrode gap.

3. The wire electrical discharge machine according to claim 2, wherein the second duration is set to be longer than the first duration.

4. The wire electrical discharge machine according to claim 3, further comprising:
   a voltage detector configured to detect a voltage across the electrode gap;
   an average voltmeter configured to measure an average voltage across the electrode gap based on the voltage across the electrode gap detected by the voltage detector; and,
   a duration setting changer configured to change at least one of the first duration and the second duration so that the average voltage across the electrode gap measured by the average voltmeter approaches a target voltage.

5. The wire electrical discharge machine according to claim 3, wherein:
   a first continuous on-time as one unit of an on-time of the first switch and a second continuous on-time as one unit of an on-time of the second switch is determined beforehand;

the first continuous on-time is a length equal to or shorter than the first duration and the second continuous on-time is equal to or shorter than the second duration;

the switch controller turns on the first switch once or a plurality of times in the first duration so as to apply the positive polarity voltage across the electrode gap and turns on the second switch once or a plurality of times in the second duration so as to apply the reverse polarity voltage across the electrode gap; and, the first continuous on-time, the second continuous on-time, the number of times the first switch is turned on in the first duration, and the number of times the second switch is turned on in the second duration are designated so that the time for which the reverse polarity voltage is actually applied across the electrode gap in the second duration is longer than the time for which the positive polarity voltage is actually applied across the electrode gap in the first duration.

6. The wire electrical discharge machine according to claim 3, wherein:

one unit of an on-time of the first switch is the first duration and one unit of an on-time of the second switch is the second duration; and, the switch controller sets the first switch on in the first duration and sets the second switch on in the second duration.

7. The wire electrical discharge machine according to claim 1, further comprising:

a voltage detector configured to detect a voltage across the electrode gap;

an average voltmeter configured to measure an average voltage across the electrode gap based on the voltage across the electrode gap detected by the voltage detector; and, a polarity determiner configured to compare the average voltage across the electrode gap measured by the average voltmeter with a target voltage, determine polarity that makes the average voltage approach the target voltage, and select the polarity to be applied next, wherein:

a first continuous on-time as one unit of an on-time of the first switch and a second continuous on-time as one unit of an on-time of the second switch is determined beforehand; and, the switch controller controls the first switch and the second switch so as to apply the voltage of the polarity determined by the polarity determiner.

8. The wire electrical discharge machine according to claim 1, wherein the second voltage applying circuit further includes a current limiting resistor inserted between the second DC power source and the electrode gap.

9. The wire electrical discharge machine according to claim 1, wherein:

the first voltage applying circuit further includes a first capacitor connected in parallel with the first DC power source;

the second voltage applying circuit further includes a second capacitor connected in parallel to the second DC power source; and the capacitance of the first capacitor is equal to or higher than the capacitance of the second capacitor.

10. The wire electrical discharge machine according to claim 1, further comprising:

a voltage detector configured to detect the voltage across the electrode gap;

a discharge determiner configured to determine whether or not electrical discharge has occurred based on the voltage across the electrode gap detected by the voltage detector;

a third voltage applying circuit including a third DC power source connected across the electrode gap so as to apply a main cutting voltage of positive polarity with the workpiece side being the positive electrode and the wire electrode side being the negative electrode; and a third switch provided between the third DC power source and the electrode gap to perform on/off switching of application of the main cutting voltage to the electrode gap;

wherein when the discharge determiner determines that electrical discharge has occurred during a period from start of application of one of the positive polarity voltage or the reverse polarity voltage to an end of the application, the switch controller turns on the third switch to apply the main cutting voltage across the electrode gap to flow main machining current therethrough.

\* \* \* \* \*